(12) United States Patent
Kim et al.

(10) Patent No.: US 9,975,782 B2
(45) Date of Patent: May 22, 2018

(54) SIOX NANOPARTICLE MANUFACTURING APPARATUS INCLUDING CRUCIBLE FOR SILICON MELTING HAVING SLIDING TYPE TAPPING STRUCTURE AND MANUFACTURING METHOD OF SIOX NANOPARTICLE USING THE SAME

(71) Applicant: KOREA INSTITUTE OF ENERGY RESEARCH, Daejeon (KR)

(72) Inventors: Joon-Soo Kim, Daejeon (KR); Bo-Yun Jang, Daejeon (KR); Jin-Seok Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 232 days.

(21) Appl. No.: 14/767,575

(22) PCT Filed: Feb. 13, 2013

(86) PCT No.: PCT/KR2013/001108
§ 371 (c)(1),
(2) Date: Aug. 12, 2015

(87) PCT Pub. No.: WO2014/126272
PCT Pub. Date: Aug. 21, 2014

(65) Prior Publication Data
US 2016/0002055 A1    Jan. 7, 2016

(30) Foreign Application Priority Data
Feb. 13, 2013 (KR) .................. 10-2013-0015196

(51) Int. Cl.
*C01B 33/18* (2006.01)
*B01J 19/24* (2006.01)

(52) U.S. Cl.
CPC ............ *C01B 33/181* (2013.01); *B01J 19/24* (2013.01); *B01J 2219/00132* (2013.01); *B01J 2219/24* (2013.01)

(58) Field of Classification Search
CPC ............ B01J 19/24; B01J 2219/00132; B01J 2219/24; C01B 33/181
(Continued)

(56) References Cited

U.S. PATENT DOCUMENTS

2011/0305891 A1* 12/2011 Jang ............ C30B 15/007
428/220
2012/0251710 A1* 10/2012 Jang ............ C01B 33/181
427/122

FOREIGN PATENT DOCUMENTS

JP    62027318 A    2/1987
JP    63103815 A    5/1988
(Continued)

OTHER PUBLICATIONS

Korea Institute of Energy Research, "Developments of low-cost ribbon solar cells(I)", Korea Research Council for Industrial Science & Technology, KIER-A82803, Dec. 31, 2008, pp. 176-180, Republic of Korea.
(Continued)

*Primary Examiner* — Scott Kastler
*Assistant Examiner* — Michael Aboagye
(74) *Attorney, Agent, or Firm* — Hauptman Ham, LLP

(57) ABSTRACT

Disclosed herein are a SiOx nanoparticle manufacturing apparatus that can not only manufacture a SiOx nanoparticle in large quantities but also prevent a silicon melt residue from being stuck and solidified on an inner bottom surface of a crucible by designing a sliding type tapping structure, and a SiOx nanoparticle manufacturing method using the same.

19 Claims, 7 Drawing Sheets

(58) Field of Classification Search
USPC ....... 266/208; 264/11–14; 117/30, 200, 222; 422/186.04, 240, 186.29; 423/348, 325; 428/402
See application file for complete search history.

(56) References Cited

FOREIGN PATENT DOCUMENTS

| | | |
|---|---|---|
| JP | 2012214353 A | 11/2012 |
| KR | 1020100042489 A | 4/2010 |
| KR | 101081864 B1 | 11/2011 |

OTHER PUBLICATIONS

International Search Report for PCT/KR2013/001108 dated Nov. 14, 2013, citing the above references.

* cited by examiner

SIOX NANOPARTICLE MANUFACTURING APPARATUS INCLUDING CRUCIBLE FOR SILICON MELTING HAVING SLIDING TYPE TAPPING STRUCTURE AND MANUFACTURING METHOD OF SIOX NANOPARTICLE USING THE SAME

CROSS REFERENCE TO RELATED APPLICATION

This application claims the priority of Korean Patent Application No. 10-2013-0015196, filed on Feb. 13, 2013 in the KIPO (Korean Intellectual Property Office). Further, this application is the National Phase application of International Application No. PCT/KR2013/001108 filed Feb. 13, 2013, which designates the United States and was published in Korean.

TECHNICAL FIELD

The present invention relates to a SiOx nanoparticle manufacturing apparatus and the manufacturing method, more specifically, to the SiOx nanoparticle manufacturing apparatus including crucible for silicon melting having sliding type tapping structure that can not only manufacture a SiOx nanoparticle in large quantities by injecting the injection gas directly on a surface of a silicon melt but also prevent a silicon melt from being stuck and solidified on an inner bottom surface of the graphite crucible in the process of cooling a silicon melt residue inside the crucible after producing nanopowder by having a sliding type tapping structure on a lower portion of the graphite crucible for melting silicon metal and the SiOx nanopowder manufacturing method using the apparatus.

BACKGROUND ART

Electromagnetic induction-based direct melting can rapidly melt metallic materials, thereby ensuring high yield with minimized contamination of raw materials. The electromagnetic induction-based direct melting is generally performed according to the following principle.

When an alternating current is applied to an induction coil wound around a crucible to induce magnetic field variation, an induction current is created on the surface of metal to be melted and generates Joule's heat, which melts the metal. Further, the induction current interacts with a magnetic field to generate the Lorentz force in molten metal.

Since the Lorentz force is always directed toward an inner center of the crucible and provides a pinch effect or electromagnetic pressure effect according to Fleming's left hand rule even when the direction of the current in the coil is varied, it is possible to prevent the molten metal from contacting an inner wall of the crucible.

However, the electromagnetic induction melting cannot be applied when melting semiconductors such as silicon. That is, since silicon has a very high melting point of 1,400° C. or more and a very low electric conductivity at 700° C. or less unlike metals, it is difficult to achieve direct electromagnetic induction-based silicon melting.

When melting the semiconductors such as silicon, indirect melting with heat from a graphite crucible is generally used. Although graphite is a non-metallic material, it has very high electric and thermal conductivity, thereby allowing the crucible to be easily heated through electromagnetic induction. When producing a SiOx nanoparticle using a molten silicon melted in such the graphite crucible, there is a limit in using entire molten silicon for manufacturing SiOx nanoparticle so that molten silicon residue on the inner bottom surface of the crucible may not exist. After SiOx nanoparticle is manufactured from molten silicon, there may be molten silicon residue inside the crucible. The molten silicon residue causes problems such as acting as a source of contamination of the molten silicon if reused after the end of reaction and shortening the life of the crucible for melting silicon due to cracks of the graphite crucible caused by a volume expansion of molten silicon. That's because the molten silicon residue is stuck on the inner bottom surface of the crucible during the cooling process.

Related Prior Art is Korea Patent Publication No. 10-2010-0042489 (Apr. 26, 2010 published). The document does not disclose SiOx nanopowder manufacturing apparatus having a silicon melting crucible with the sliding type tapping structure and a SiOx nanopowder manufacturing method using the apparatus. In the document, only a graphite crucible for electromagnetic induction melting silicon and apparatus for silicon melting and refining using the graphite crucible has been disclosed.

DISCLOSURE

Technical Problem

An aspect of the present invention is to provide SiOx nanoparticle manufacturing apparatus including crucible for silicon melting having sliding type tapping structure that can manufacture SiOx nanoparticle by induction-heating and melting the metal silicon itself using an electromagnetic induction-melting method which utilizes induction coils and by injecting various injection gas on the surface of the molten silicon as well as that can prevent molten silicon residue in the crucible from being stuck and solidified on the inner bottom surface of the graphite crucible in the process of cooling silicon material after melting reaction and to provide a SiOx nanoparticle manufacturing method using the apparatus.

Technical Solution

In accordance with a first aspect of the present invention, there is provided a SiOx nanoparticle manufacturing apparatus including crucible for silicon melting having sliding type tapping structure, including: a vacuum chamber providing a reaction space; a silicon melting crucible having a melting crucible body having a vessel shape which opened at an upper side thereof, the melting crucible body being provided in the vacuum chamber, a tapping container being attached at a lower side of the melting crucible body and having a sliding insertion groove, the sliding insertion groove being extend toward a center of the tapping container from the outer wall of the tapping container, and a tapping opening and closing bar configured to slidably coupled with the sliding insertion groove; an induction-melting unit to form silicon melt by induction heating the silicon charged into the silicon melting crucible; a gas injection unit for injecting an injection gas to be in direct contact with a surface of the silicon melt in the silicon melting crucible; and a collecting unit disposed at an upper side of the silicon melting crucible in a spaced-apart relationship and collecting SiOx vapor volatilized by the reaction between the silicon melt and the injection gas.

In accordance with a second aspect of the present invention, there is provided a SiOx nanoparticle manufacturing method including crucible for silicon melting having sliding type tapping structure, including: a silicon charging step (a) where silicon is charged in the silicon melting crucible; an induction-melting step (b) forming silicon melt by induction-heating the silicon charged into the silicon melting crucible; a gas injection step (c) for injecting an injection gas to be in direct contact with a surface of the silicon melt; a collecting step (d) for collecting SiOx particles by cooling and condensing SiOx vapor volatilized by the reaction between the silicon melt and the injection gas; a cleaning step (e) for taking out to the outside and cleaning a tapping opening and closing bar slidably inserted inside the silicon melting crucible after the end of the reaction between the silicon melt and the injection gas.

Advantageous Effects

The present invention can manufacture highly pure SiOx nanoparticle having a particle size of less than 50 nm within a short time at low cost by applying an electromagnetic induction-melting method and a volatile quenching method at the same time.

In addition, the present invention has an advantage of preventing the problem that molten silicon residue inside a melting crucible body is solidified stuck on the bottom surface of it by having a tapping structure that can discharge molten silicon residue in a crucible using a tapping opening and closing bar at a temperature of the molten silicon before solidification.

Further, SiOx nanoparticle manufacturing apparatus according to the present invention can further improve the charging and discharging efficiency of lithium-ion batteries thanks to the improvement of the electric conductivity by carbon-coating when carbon-coated SiOx-C particles are utilized as the negative electrode material of lithium-ion batteries. That's because the apparatus can make SiOx particles and coat with carbon at the same time.

BEST MODE

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention will be defined only by the claims. Identical components will be designated by like reference symbols throughout the specification.

With reference to the accompanying drawings, the followings are the detailed description of SiOx nanoparticle manufacturing apparatus having a silicon melting crucible with a sliding type tapping structure and a SiOx nanoparticle manufacturing method using the apparatus according to the preferable examples of the present invention.

Figure 1:
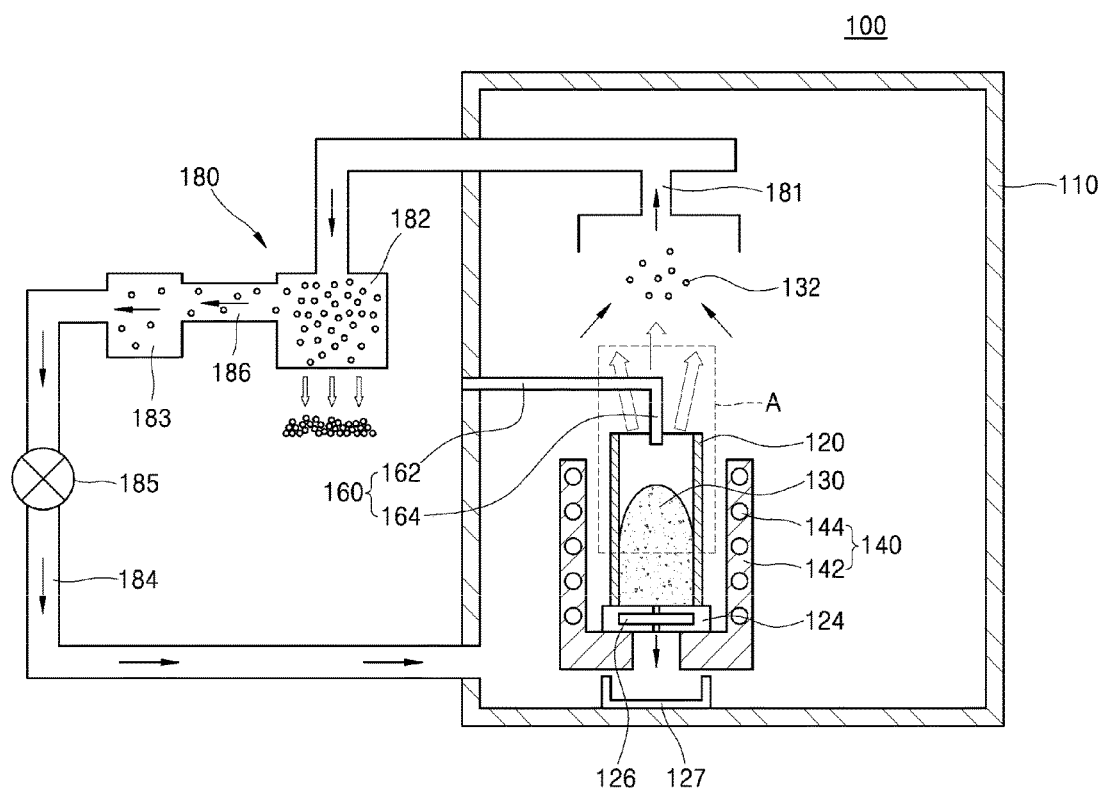
FIG. 1 is a cross sectional view showing SiOx nanoparticle manufacturing apparatus having a silicon melting crucible according to an example of the present invention.
Figure 2:
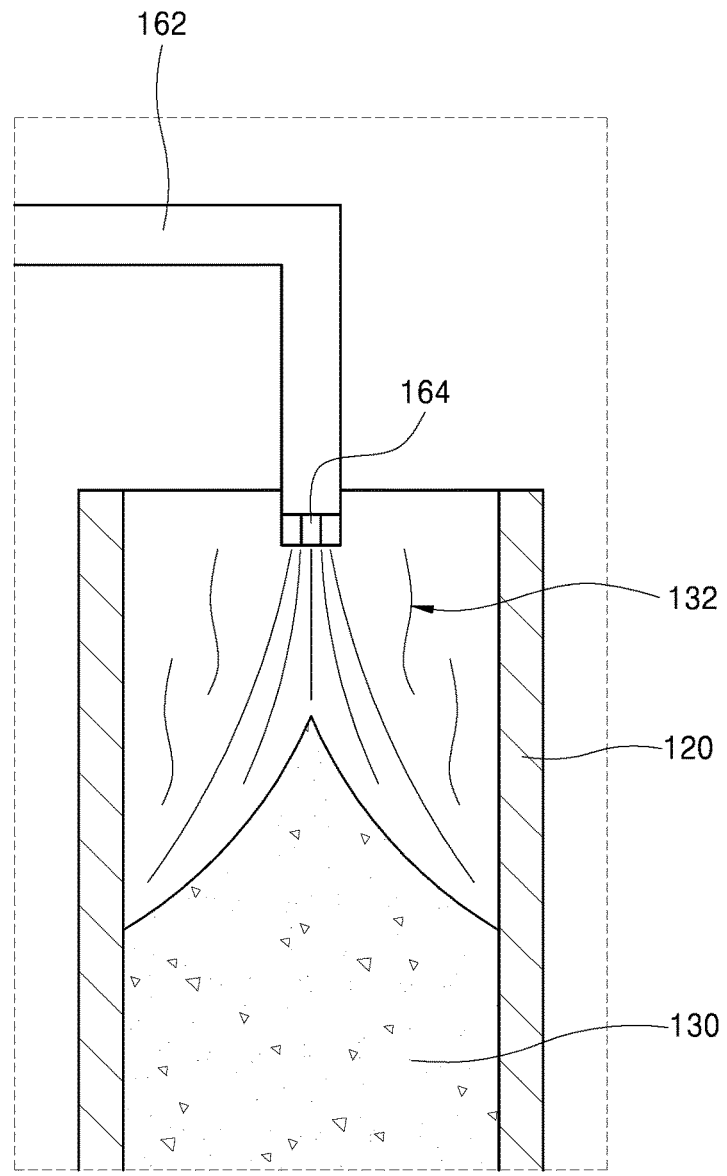
FIG. 2 is an enlarged view showing a portion A in FIG. 1.

FIG. 1 is a cross sectional view showing SiOx nanoparticle manufacturing apparatus having a silicon melting crucible according to an example of the present invention and FIG. 2 is an enlarged view showing a portion A in FIG. 1.

Referring to FIG. 1, SiOx nanoparticle manufacturing apparatus 100 in accordance with examples of the present invention has comprises a vacuum chamber 110, a silicon melting crucible 120, an induction-melting unit 140, a gas injection unit 160 and a collecting unit 180.

The vacuum chamber 110 provides a sealed reaction space for forming SiOx nanoparticles. It is desirable to maintain clean vacuum state in an inside of the vacuum chamber 110.

The silicon melting crucible 120 is provided in the inside of the vacuum chamber 110. At this point, the silicon melting crucible 120 is formed with a shape of a vessel whose upper portion is opened and a metal silicon which is a raw material of the SiOx nanoparticle is charged into the crucible.

The silicon melting crucible 120 is provided in the inside of the vacuum chamber 110. The silicon melting crucible 120 includes a melting crucible body 122 formed with a shape of a vessel whose upper part is opened, a tapping container 124 being arranged at a lower side of the body 122 and having a sliding insertion groove (not shown) extending toward a center from an outer wall, and a tapping opening and closing bar 126 slidably coupled with the sliding insertion groove of the tapping container 124. The silicon melting crucible 120 may further include a tapping molten silicon storage container 127 that can store discharged molten silicon. The specific description thereof is to be described later.

The induction-melting unit 140 includes an amorphous refractory 142 and an induction coil 144. The amorphous refractory 142 may be formed in the shape of surrounding the outside of the silicon melting crucible 120. The induction coil 144 is formed so as to wind around an outer circumferential surface of the silicon melting crucible 120. In this case, the induction coil 144 may be embedded in the amorphous refractory 142. Although not shown in the drawings, the induction coil 144 may be attached to the inner wall of the amorphous refractory 142.

The induction-melting unit 140 melts the metal silicon charged into the graphite crucible 122 by induction-heating and forms a silicon melt 130. The electromagnetic force generated by the induction-melting unit 140 is exerted toward a center of the inside of the silicon melting crucible 120.

The silicon melt 130 is separated from a sidewall of the silicon melting crucible 120 and rises to a center portion thereof by the electromagnetic field caused by the induction-heating and a surface area of the silicon melt 130 is increased by stirring caused by the electromagnetic field acting on the silicon melt 130.

In this case, an alternating current, which is applied to the induction coil 144 of the induction-melting unit 140, may be used from a low frequency to a high frequency.

When the frequency applied to the induction coil 144 is lowered below 10 kHz, the electromagnetic field can be formed into the deep portion of the inside of the silicon melt 130, thereby the flow of the melted silicon can be maximized. Therefore, it is preferable to have a frequency below 10 kHz.

Like this, when the silicon melt 130 is generated by the electromagnetic field, the surface of the silicon melt flow more actively and a surface area for forming the SiOx nanoparticle is increased, thereby a volatilization efficiency of a silicon gas can be improved. Here, since the metal silicon has a low electrical conductivity in a temperature of below about 700° C., the metal silicon is initially indirectly heated by the heat applied to the silicon melting crucible 120, and, in a temperature above about 700° C., the electrical conductivity of the metal silicon is rapidly increased so that the electromagnetic induction melting generally used.

Various metals may be charged in the silicon melting crucible 120 which is used for the induction-melting for manufacturing nano-metal powder. Target metals are Si, Ti, Ag, Al, Au, Cu, Pt, Mg, Zn, Sn and the like. However, the target metals are not limited thereto, but nanoparticles of various metals can be manufactured.

Referring to FIGS. 1 and 2, the gas injection unit 160 is used for injecting an injection gas to be in direct contact with the surface of the silicon melt 130 inside the silicon melting crucible 120. To this end, the gas injection unit 160 includes a gas supply pipe 162 through which the injection gas is supplied, and a spray nozzle 164 provided at the end portion of the gas supply pipe 162 and arranged inside the silicon melting crucible 120. Although not illustrated in the drawings, the gas injection unit 160 is arranged outside the vacuum chamber 110 and may further include a gas storage tank for supplying the injection gas to the gas supply pipe 162, a water trap device and a flow rate control unit (not shown) for a constant gas supply.

Here, the injection gas injected from the gas injection unit 160, in particular, the spray nozzle 164 of the gas injection unit 160 generates a SiOx nanoparticle 132 by the reaction with the silicon melt 130, and then, the SiOx nanoparticle 132 flows into the collecting unit 180 disposed above the silicon melting crucible 120 in a spaced-apart relationship. At this time, it is preferable for the injection gas to be injected immediately before the silicon to be melted by induction-heating of the induction-melting unit 140 forms the silicon melt 130.

Ar, $H_2$, $O_2$, $H_2O$ and the like may be used as the injection gas. These gases may be used alone or in mixture of two or more. Among the injection gases, Ar gas is mixed for cooling or making inert atmosphere and $H_2$ gas is mixed for a reduction reaction. $N_2$ gas can also be mixed to form a metal nanoparticle of nitride.

In this case, "x" value in SiOx can be determined by $O_2$ gas injected through the gas injection unit 160, the supply amount of $H_2O$, and various partial pressure. In addition, according to a flow rate of the injection gas and a shape and location of the gas supply pipe 162, size and shape of crystal grains of the SiOx nanoparticle may be changed.

The collecting unit 180 is disposed outside the vacuum chamber 110 and collects SiOx nanoparticle 132 generated by the reaction between the silicon melt 130 and the injection gas. The collecting unit 180 may include a vapor movement section 181, collecting sections 182 and 183, and a gas circulation section 184.

The vapor movement section 181 is arranged to face the upper portion of the silicon melting crucible 120. As a result, Si vapor volatilized from melted silicon formed by induction-melting in the silicon melting crucible 120 flows into the vapor movement section 181, or SiOx nanoparticle generated from the reaction with the surface of the silicon melt and unreacted Si vapor do so.

Collecting sections 182 and 183 collect SiOx nanoparticle 134 by cooling and condensing SiOx nanoparticle 132 which flows via the vapor movement section 181. When SiOx nanoparticle 132 flows into the collecting sections 182 and 183, some SiOx nanoparticle generates cooled and condensed SiOx nanoparticle 134 and the other flows into the gas circulation section 184 that will be described later.

A particular structure (not shown) having a sharp temperature difference may be arranged in order to facilitate cooling and condensing in the collecting sections 182 and 183. At this time, SiOx nanoparticle 132 is transferred by the pressure difference, which is generated by controlling the pressure of a gas injection section 181 and collecting sections 182 and 183 differently.

The gas circulation section 184 makes gases other than the nanoparticle collected in the collecting sections 182 and 183 circulate and flow into the vapor movement section 182 again. For this reason, a circulating pump 185 may be disposed in the gas circulation section 184 for circulating gases.

In addition, the collecting unit 180 may further include a coating gas injection section 186 arranged between the vapor movement section 181 and the collecting sections 182 and 183. The coating gas injection section 186 is provided for carbon-coating with respect to the SiOx nanoparticle 132 which flows into the collecting sections 182 and 183 via the vapor movement section 181, and the coating gas injection section 186 may be omitted, if necessary. Although not shown in the drawings, injection nozzles (not shown) injecting coating gases or coating solution may be arranged in the coating gas injection section 186.

Further, Ar, $H_2$, and alkane based gases such as $CH_4$, $C_2H_6$, $C_3H_8$, $C_4H_{10}$, $C_5H_{12}$, $C_6H_{14}$ may be used as coating gases. These gases may be supplied alone or in mixture of two or more thereof. Among the coating gases, Ar gas is mixed for dilution and $H_2$ gas is mixed for a reduction reaction.

In addition, carbon-based materials including natural graphite, artificial graphite, graphene, or the like can be used as coating solutions, and these materials can be supplied alone or in mixture of two or more thereof. In particular, SiOx nanoparticle 134 may form a SiOx-C complex by coating gases or coating solutions. In this case, it is possible manufacturing SiOx nanoparticle 134 and carbon-coating at the same time.

Figure 3:
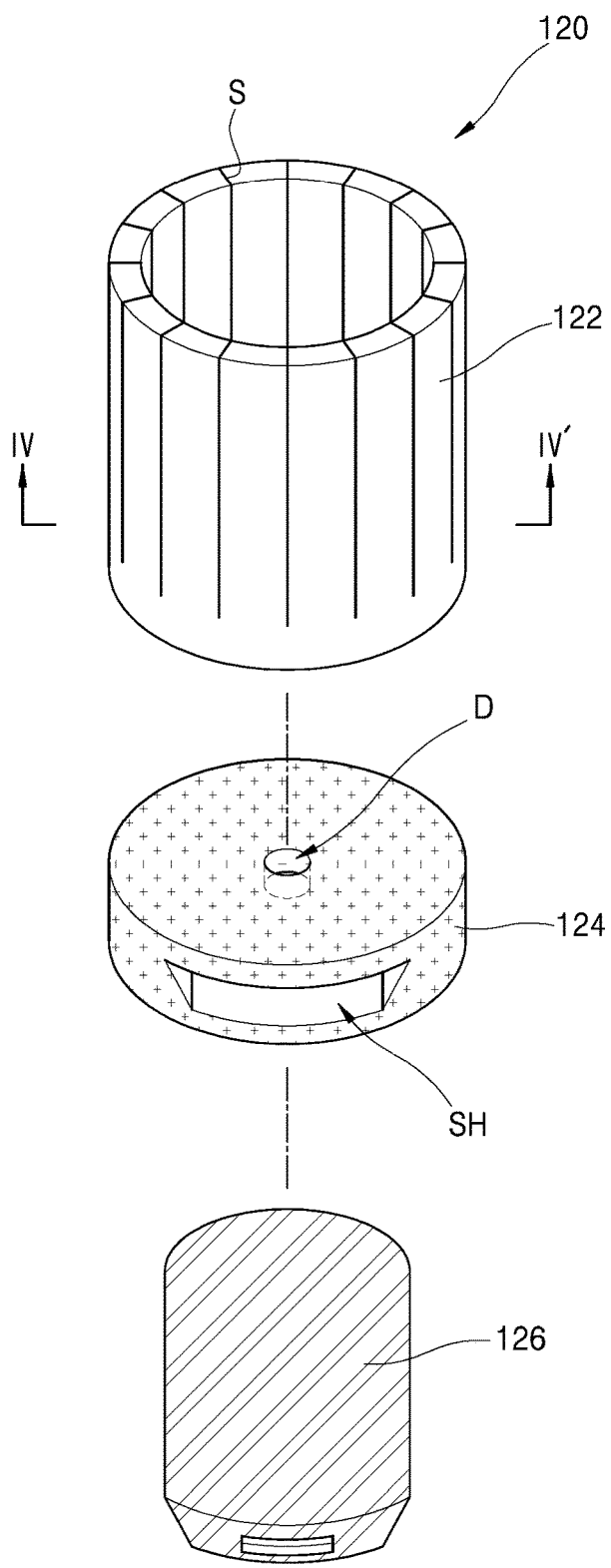
FIG. 3 is an exploded perspective view showing the silicon melting crucible in FIG. 1.
Figure 4:
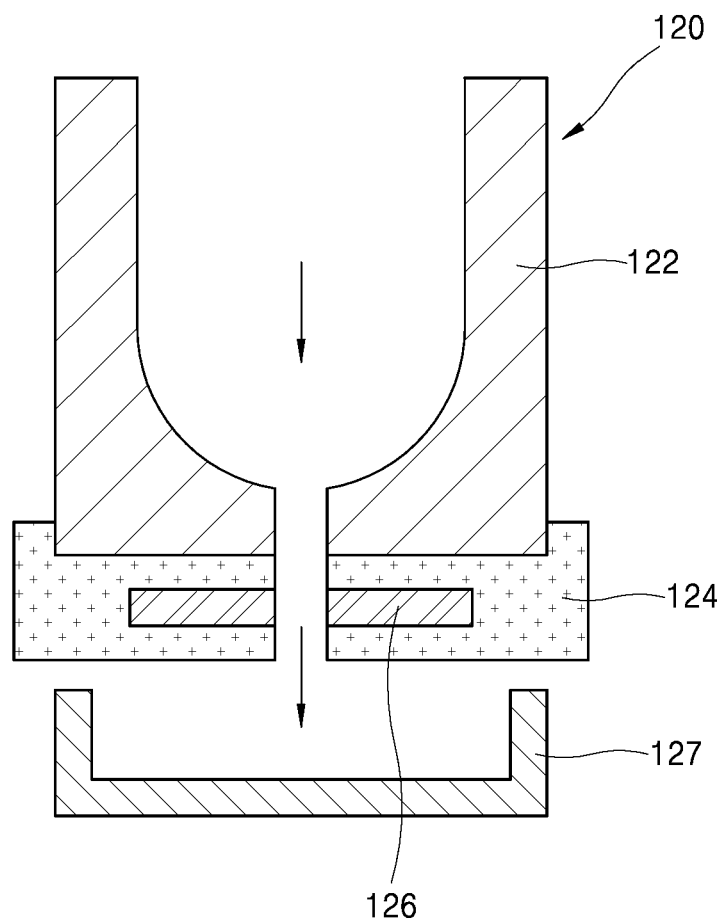
FIG. 4 is a section view showing a plane being cut along IV-IV' line in FIG. 3.

On the other hand, FIG. 3 is an exploded perspective view showing the silicon melting crucible in FIG. 1 in an enlarged scale, and FIG. 4 is a section view showing a plane being cut along the IV-IV' line in FIG. 3. In particular, FIG. 3 shows the silicon melting crucible including the melting crucible body, the tapping container, and the tapping opening and closing bar slidably coupled with the sliding insertion hole of the tapping container.

Figure 5:
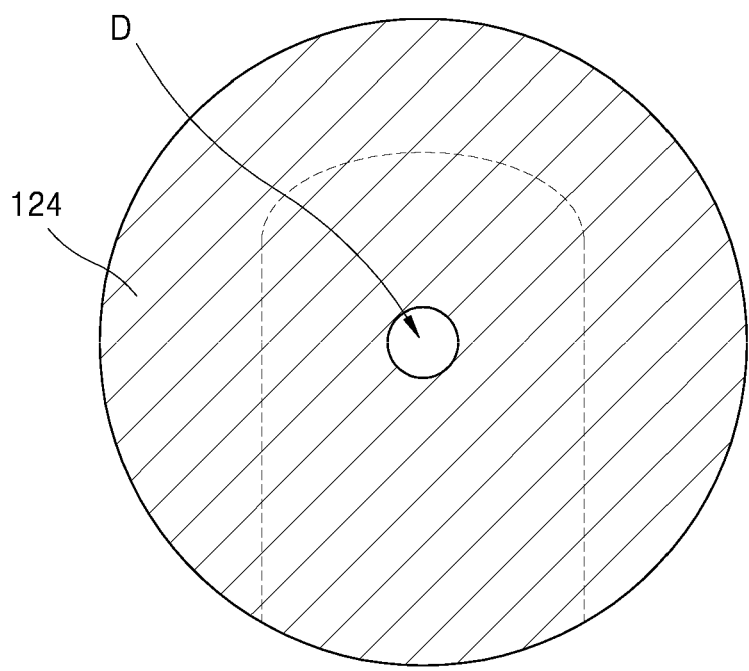
FIG. 5 is a plan view showing a bottom surface of a tapping container in FIG. 3.
Figure 6:
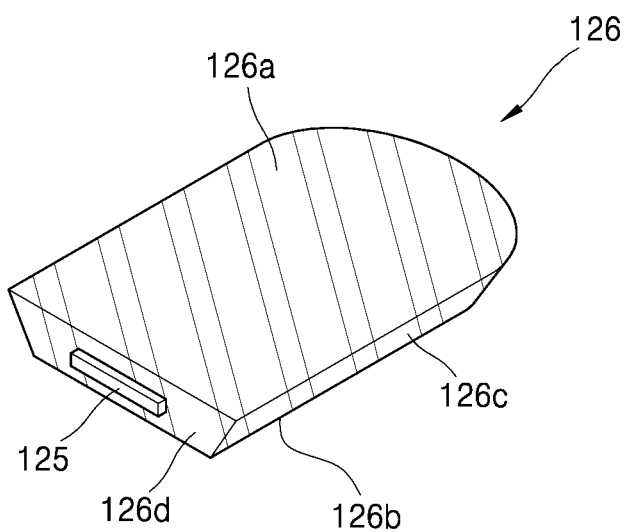
FIG. 6 is an enlarged perspective view showing a tapping opening and closing bar, which is slidably inserted into a sliding insertion hole of a tapping container in FIG. 3.

In addition, FIG. 5 is a plan view showing the bottom surface of a tapping container in FIG. 3 and FIG. 6 is a perspective view showing an enlarged tapping opening and closing bar, which is configured to be slidably fitted into the sliding insertion hole of the tapping container in FIG. 3.

Referring to FIGS. 3 and 4, the silicon melting crucible 120 includes the melting crucible body 122, the tapping container 124 and a tapping opening and closing bar 126 for slidable fitting with the sliding insertion groove SH of the tapping container 124. Further, the tapping molten silicon storage container 127 for storing discharged molten silicon is positioned at the side of the silicon melting crucible 120.

The melting crucible body 122 is formed with a shape of a vessel whose upper part is opened and metal silicon is charged into an inside of the melting crucible body 122. Further, the melting crucible body 122 has a discharge hole (not shown) which extends through the inner center thereof. Predetermined amount of silicon raw materials are provided into the inside of the melting crucible body 122. At this time, the discharge hole is formed to penetrate the inner center of the melting crucible body 122 in a vertical direction. Through the discharge hole, after producing SiOx nanoparticle, the silicon melt 130 remaining inside the melting crucible body 122 is discharged.

In addition, the melting crucible body 122 is provided with a plurality of slits S, part of whose walls are cut off in a longitudinal direction. The slits S may be formed into the form of cutting off the outer wall and the inner wall. Thus, the melting crucible body 122 is divided into individual segments by the slits S. In this way, when the slits S are formed in the longitudinal direction, electromagnetic waves are not shielded and electromagnetic force exerted intensively toward the center of the melting crucible body 122 even though the melting crucible body 122 is made of graphite material. As a result, silicon is melted by induction heating and the silicon melt can be formed without making contact with the inner wall of the melting crucible body 122, by the electromagnetic force exerted toward the inner center of the melting crucible body 122.

The slits S may be formed from the upper side to the lower side of the melting crucible body 122. Further, the slits S may be also formed symmetrically along a periphery of the melting crucible body 122.

The tapping container 124 is attached to the lower side of the melting crucible body 122. The tapping container 124 includes the discharge groove D formed in a position corresponding to the discharge hole provided in the melting crucible body 122, and the sliding insertion groove SH formed to extend from an outer wall of the tapping container 124 toward a center of the tapping container 124. At this time, it is preferable for the discharge groove D to have a diameter corresponding to the discharge hole, but it is not necessarily limited thereto. In other words, the discharge groove D can be designed to have small or large diameter compared with the discharge hole. In the present invention, the center is not limited to the dead center of the melting crucible body 122 but can be broadly interpreted as the areas other than the periphery thereof.

The tapping opening and closing bar 126 serves to open and close the discharge hole formed in the lower portion of the melting crucible body 122. The tapping opening and closing bar 126 may be a bar type, but it is not limited thereto. A valve type may also be used. The melting crucible body 122 stores silicon raw materials and includes the discharge hole in the lower portion thereof.

In the case of a typical graphite crucible, electromagnetic force hardly exerted inside the melting crucible body 122 because electromagnetic waves were shielded by the graphite even if alternating current power supply was applied to the induction coil 144. However, experimental results confirmed that when the slits S are formed in the longitudinal direction, electromagnetic waves are not shielded and electromagnetic force exerts intensively toward the center of the melting crucible body 122 even though the melting crucible body 122 is made of graphite material. As a result, silicon was melted by induction heating and silicon melt 130 could be formed without making contact with the inner wall of the melting crucible body 122, by the electromagnetic force acting toward the inner center of the melting crucible body 122.

The tapping opening and closing bar 126 for tapping the silicon melt 130 through the discharge hole and the discharge groove D is slidably coupled with the sliding insertion hole SH of the tapping container 124. The discharge hole and the discharge groove D are provided in the melting crucible body 122 made of graphite material and the tapping container 124 attached to the lower portion of the melting crucible body 122, respectively. A center portion of the tapping opening and closing bar 126 is preferred to be inserted in a position corresponding to the discharge groove D, which is to lead silicon melt 130 melted by induction-heating after charged into the silicon melting crucible 122 to stable tapping through the discharge hole and the discharge groove D.

At this time, the tapping opening and closing bar 126 is used while inserted in a sliding insertion groove SH of the silicon melting crucible 122 using a gripper (not shown) at the time of the reaction of silicon melting.

The tapping container 124 and the tapping opening and closing bar 126 may be formed of graphite or quartz material. In particular, it is preferable to form a tapping opening and closing bar 126 with graphite which is the same kind of material as a silicon melting crucible 122. That's because the tapping opening and closing bar 126 is slidably coupled with the sliding insertion groove SH and directly contacts with molten silicon inside the silicon melting crucible 122 in the process of induction-heating.

Referring FIGS. 5 and 6, on the other hand, the tapping opening and closing bar 126 is inserted into the sliding insertion groove (SH in FIG. 3) and coupled to the interior of the tapping container 124. In this case, the dotted line in FIG. 5 may be defined as a region in which the tapping opening and closing bar 126 is slidably inserted.

The tapping opening and closing bar 126 is inserted in a sliding insertion groove of the tapping container 124 and may have a top surface 126a exposed by the discharge groove D, a lower surface 126b placed in a position in contact with an inner bottom surface of the tapping container 124 and side surfaces 126c connecting the top surface 126a and the bottom surface 126b.

At this time, the top surface 126a of the tapping opening and closing bar 126 is disposed, being inserted in the sliding insertion groove, and it is in contact with molten silicon inside the melting crucible body 122 melted by induction-heating. Opposite side surfaces 126c of the tapping opening and closing bar 126 have a reverse taper shape as viewed in a cross-section. Like this, the formation of the reverse taper shape is to make sliding coupling of the tapping opening and closing bar 126 more easily.

The tapping opening and closing bar 126 can be inserted into and removed from the sliding insertion hole SH of the tapping container 124 by a gripper (not shown).

In addition, the tapping opening and closing bar 126 further includes a grip projection 125, for a gripper (not shown) to grip, formed on another side surface 126d, which is a different side surface from the opposite side surfaces 126c.

Specifically, another side surface 126d can be formed on the portion corresponding to the outer circumferential surface of the tapping container 124 when slidably coupled. Further, the other side surface opposite to another side 126d is disposed in the interior of the tapping container 124 when slidably coupled. It may also be designed as a round shape, but it is not necessarily limited thereto. The grip projection 125 may be formed so as to protrude in a hexahedron structure, but it is not necessarily limited thereto. If the grip projection 125 has a protruding shape for easy gripping to the gripper, any form does not matter.

As described above, SiOx nanoparticle manufacturing apparatus including crucible for silicon melting having sliding type tapping structure according to the examples of the present invention can manufacture highly pure SiOx nanoparticle having a particle size of less than about 50 nm within a short time at low cost by applying an electromagnetic induction-melting method and a volatile quenching method at the same time.

In addition, the SiOx nanoparticle manufacturing apparatus according to the present invention has advantages that molten silicon in the liquid state just before solidified can be washed and then reused, or the molten silicon residue inside the melting crucible body is prevented from being solidified stuck on its bottom surface since a new tapping opening and closing bar can be used, by having a tapping structure that can retrieve a tapping opening and closing bar using a gripper at a temperature before molten silicon being solidified.

Further, the SiOx nanoparticle manufacturing apparatus according to the present invention is capable of manufacturing SiOx particles and carbon-coating at the same time. Thus, when carbon-coated SiOx-C particles are utilized as negative electrode material of lithium-ion batteries, the charging and discharging efficiency of lithium-ion batteries can be improved thanks to the improvement of the electric conductivity by carbon-coating.

Hereinafter, with reference to the accompanying drawings, detailed description about a SiOx nanoparticle manufacturing method using the silicon melting crucible with the sliding type tapping structure according to the example of the present invention will be as follows.

Figure 7:
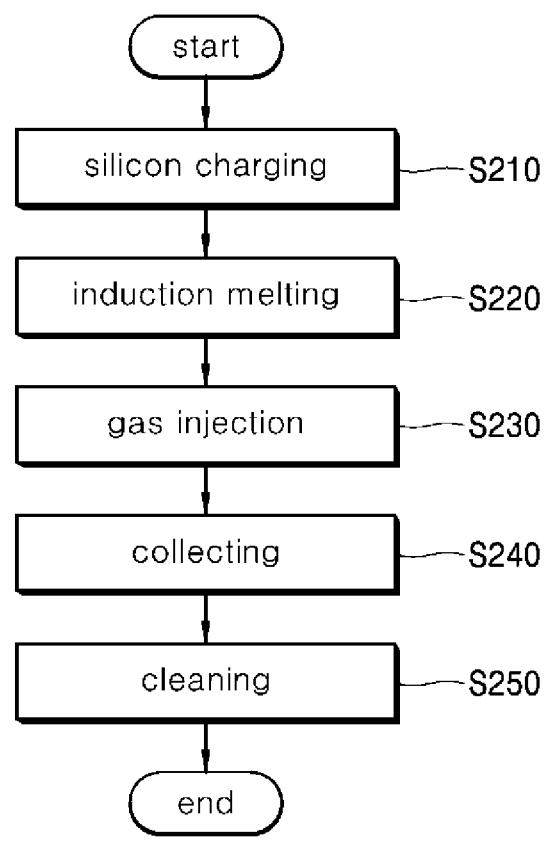
FIG. 7 is a process flow chart showing a SiOx nanoparticle manufacturing method having a silicon melting crucible according to the example of the present invention.

FIG. 7 is a process flow chart showing a SiOx nanoparticle manufacturing method having the silicon melting crucible according to the example of the present invention.

Referring to FIG. 7, the SiOx nanoparticle manufacturing method having the silicon melting crucible according to the example of the present invention includes a silicon charging step S210, an induction-melting step S220, a gas injection step S230, a collecting step S240 and a cleaning step S250.

Silicon Charging

In a silicon charging step S210, a predetermined amount of silicon is charged into the silicon melting crucible. At this point, the silicon melting crucible is provided in the vacuum chamber. Further, the silicon melting crucible has the melting crucible body being attached to the inside of the vacuum chamber and formed with a vessel shape which opened at an upper side thereof, the tapping container being attached at the lower side of the melting crucible body and having a sliding insertion groove extending toward the center from the outer wall, and the tapping opening and closing bar slidably coupled with the sliding insertion hole of the tapping container.

Induction-Melting

In an induction-melting step S220, molten silicon is formed by induction heating to the silicon charged into the silicon melting crucible. In this case, by the electromagnetic field caused by induction-heating, molten silicon is separated from the sidewalls of the silicon melting crucible and rises to the center, and the surface area of the silicon melt is increased by stiffing caused by the electromagnetic field acting on the silicon melt. Here, it is desirable for a AC current below 10 kHz to be applied to the induction coil surrounding outer peripheral surface of the silicon melting crucible. When the frequency applied to the induction coil is lowered below 10 kHz, it is possible to form electromagnetic fields to the deep part of the inside of the silicon melt, which can maximize the flow of the melted silicon. The flow can make the surface state of silicon melt keep more unstable, resulting in improving volatilization efficiency of silicon melt.

Gas Injection

In a gas injection step S230, an injection gas is injected so as to be in direct contact with the surface of silicon melt. Here, the injection gas generates SiOx nanoparticle by the reaction with the silicon melt. At this time, it is desirable for the injection gas to be injected immediately before silicon melted by induction-heating forms the silicon melt.

Ar, $H_2$, $O_2$, $H_2O$ and the like may be used as the injection gas. These gases may be used alone or in mixture of two or more thereof. During the gas injection step S230, x value in SiOx can be determined through various partial pressure of the injection gas. In addition, according to a flow rate of the injection gas and a shape and location of the gas supply pipe 162, size and shape of crystal grains of the SiOx nanoparticle may be changed.

Collecting

In a collecting step S240, SiOx nanoparticle generated by the reaction between silicon melt and injection gas is collected.

In this case, the collecting step S240 can be divided into a step of introducing SiOx nanoparticle volatilized by induction-heating inside the silicon melting crucible into the vapor movement section, a step of obtaining a SiOx nanoparticle by cooling and condensing the SiOx nanoparticle flowed through the vapor movement section in the collecting section, and a step of reintroducing gases other than the SiOx nanoparticle collected in the collecting section circulate and flow into the vapor movement section.

In addition, the collecting step S240 may further include a step to inject coating gas to SiOx vapor in a coating gas injection section arranged between the vapor movement section and the collecting section. The coating gas injection step is preferably performed between the step of introducing SiOx nanoparticle into the vapor movement section and the step of obtaining the SiOx nanoparticle.

The coating gas injection step is conducted for performing carbon-coating with respect to SiOx nanoparticles. At this time, Ar, $H_2$ and alkanes gases including, e.g., $CH_4$, $C_2H_6$, $C_3H_8$, $C_4H_{10}$, $C_5H_{12}$, $C_6H_{14}$ may be used as the coating gases. These gases may be supplied alone or in mixture of two or more thereof.

Cleaning

In a cleaning step S250, the tapping opening and closing bar sliding inserted inside the tapping container of the silicon melting crucible is taken out to the outside and washed after the end of the reaction between the silicon melt and the injection gas.

At this time, the tapping opening and closing bar is discharged to the outside of the silicon melting crucible in the state that the gripper grips the grip projection which are provided to it. In particular, in this step, the tapping opening and closing bar for silicon is preferably discharged in a state where the silicon melt is in a liquid state before solidified.

The SiOx nanoparticle manufacturing method according to the above-described embodiments of the present invention can manufacture highly pure SiOx nanoparticle having a particle size of approximately 50 nm or less within a short time at low cost by applying an electromagnetic induction-melting method and a volatile quenching method at the same time.

In addition, SiOx nanoparticle manufacturing method according to the present invention has an advantage of preventing the problem that silicon melt residue inside a melting crucible body is solidified stuck on the bottom surface of it by having a tapping structure that can discharge the silicon melt residue to the outside of the silicon melting crucible in a liquid state where the silicon melt is not solidified.

It will be understood by those skilled in the art that these embodiments are provided for illustration only and various modifications, changes, alterations and equivalent embodiments can be made without departing from the scope of the present invention. Therefore, the scope and sprit of the invention should be defined only by the accompanying claims and equivalents thereof.

The invention claimed is:

1. A SiOx nanoparticle manufacturing apparatus, comprising:
   a vacuum chamber providing a reaction space;
   a silicon melting crucible including a melting crucible body having a vessel shape which opened at an upper side thereof, the melting crucible body being provided in the vacuum chamber, a tapping container being attached at a lower side of the melting crucible body and having a sliding insertion groove extending toward a center of the tapping container from the outer wall of the tapping container, and a tapping opening and closing bar configured to slidably coupled to the sliding insertion groove;
   an induction-melting unit for forming silicon melt by induction heating the silicon charged into the silicon melting crucible;
   a gas injection unit for injecting an injection gas to be in direct contact with a surface of the silicon melt in the silicon melting crucible; and
   a collecting unit disposed above the silicon melting crucible in a spaced-apart relationship to collect SiOx vapor volatilized by a reaction between the silicon melt and the injection gas,
   wherein the tapping opening and closing bar comprises:
      an upper surface exposed by a discharge groove of the tapping container when the tapping opening and closing bar is inserted in the sliding insertion groove of the tapping container;
      a lower surface to be placed in a position in contact with an inner bottom surface of the tapping container; and
      opposite side surfaces connecting the upper surface and the lower surface.

2. The SiOx nanoparticle manufacturing apparatus of claim 1, wherein the melting crucible body has an inner bottom surface and a discharge hole extended through a center of the inner bottom surface, and the tapping container has the discharge groove that is formed in an inner center thereof and arranged in a position corresponding to the discharge hole.

3. The SiOx nanoparticle manufacturing apparatus of claim 2, wherein the discharge groove has a diameter corresponding to the discharge hole.

4. The SiOx nanoparticle manufacturing apparatus of claim 1, wherein the melting crucible body has a plurality of slits, part of whose walls are cut off in the longitudinal direction.

5. The SiOx nanoparticle manufacturing apparatus of claim 1, wherein the tapping container and the tapping opening and closing bar is formed of graphite or quartz material.

6. The SiOx nanoparticle manufacturing apparatus of claim 1, wherein a central portion of the tapping opening and closing bar is configured to be inserted in a position corresponding to a discharge hole.

7. The SiOx nanoparticle manufacturing apparatus of claim 1, wherein the upper surface of the tapping opening and closing bar is inserted in the sliding insertion groove and contacts with the silicon melt melted by induction-heating in the melting crucible body.

8. The SiOx nanoparticle manufacturing apparatus of claim 1, wherein the tapping opening and closing bar includes a grip projection formed on another side surface different from the opposite side surfaces of the tapping opening and closing bar, so that the grip projection is gripped by a gripper.

9. The SiOx nanoparticle manufacturing apparatus of claim 1, wherein the induction-melting unit includes an amorphous refractory surrounding an outside of the silicon melting crucible and an induction coil which is embedded in a wall surface of the amorphous refractory and arranged so as to wind around an outer circumferential surface of the silicon melting crucible.

10. The SiOx nanoparticle manufacturing apparatus of claim 1, wherein the gas injection unit includes a gas supply pipe through which the injection gas is supplied, and a spray nozzle provided at an end portion of the gas supply pipe and arranged inside the silicon melting crucible.

11. The SiOx nanoparticle manufacturing apparatus of claim 1, wherein the injection gas is one, or two or more gas mixture selected from Ar, $H_2$, $O_2$, and $H_2O$.

12. The SiOx nanoparticle manufacturing apparatus of claim 1, wherein the collecting unit includes a vapor movement section in which SiOx nanoparticle manufactured by induction heating in the silicon melting crucible is introduced, a collecting section in which SiOx nanoparticle generated by cooling and condensing SiOx nanoparticle introduced via the vapor movement section is obtained, and a gas circulation section for reintroducing into the vapor movement section by circulating gases in the collecting section.

13. The SiOx nanoparticle manufacturing apparatus of claim 12, wherein the collecting unit further includes a coating gas injection section arranged between the vapor movement section and the collecting section, and injecting a coating gas to the SiOx vapor introduced into the collecting section.

14. The SiOx nanoparticle manufacturing apparatus of claim 13, wherein the coating gas includes one, or two or more gas mixture selected from Ar, $H_2$, $CH_4$, $C_2H_6$, $C_3H_8$, $C_4H_{10}$, $C_5H_{12}$, and $C_6H_{14}$.

15. A SiOx nanoparticle manufacturing method using the SiOx nanoparticle manufacturing apparatus of claim 1, comprising:
   a silicon charging step (a) where silicon is charged in the silicon melting crucible;
   an induction-melting step (b) forming the silicon melt by induction-heating the silicon charged into the silicon melting crucible;
   a gas injection step (c) for injecting the injection gas to be in direct contact with the surface of the silicon melt;
   a collecting step (d) for collecting SiOx particles by cooling and condensing SiOx vapor volatilized by the reaction between the silicon melt and the injection gas;
   a cleaning step (e) for taking out to the outside and cleaning the tapping opening and closing bar slidably inserted inside the silicon melting crucible after an end of the reaction between the silicon melt and the injection gas.

16. The SiOx nanoparticle manufacturing method of claim 15, wherein the injection gas is at least one of gases selected from Ar, $H_2$, $O_2$ or $H_2O$ and the coating gas is at least one of gases selected from Ar, $H_2$, $CH_4$, $C_2H_6$, $C_3H_8$, $C_4H_{10}$, $C_5H_{12}$ and $C_6H_{14}$.

17. The SiOx nanoparticle manufacturing method of claim 15, wherein the collecting step includes:
   a step (d1) that SiOx nanoparticle volatilized by induction-heating in the silicon melting crucible flows into a vapor movement section;
   a step (d2) that SiOx nanoparticle is obtained by cooling and condensing the SiOx nanoparticle which is introduced via the vapor movement section, in a collecting section; and
   a step (d3) that a gas is circulated by a gas circulation section and reintroduced into the vapor movement section, in the collecting section.

18. The SiOx nanoparticle manufacturing method of claim 17, further including, between the step (d1) and the step (d2), a step (d'1) to inject a coating gas to SiOx nanoparticle in a coating gas injection section arranged between the vapor movement section and the collecting section.

19. The SiOx nanoparticle manufacturing method of claim 15, wherein, in the step (e), the tapping opening and closing bar is discharged outside the tapping container in the state where a gripper grips the grip projection of the tapping opening and closing bar and the tapping opening and closing bar is discharged in a state where the silicon melt is in a liquid state before solidified.

\* \* \* \* \*